United States Patent
McWhirter et al.

(10) Patent No.: US 10,338,199 B1
(45) Date of Patent: Jul. 2, 2019

(54) TRANSCEIVER APPARATUS, METHOD AND APPLICATIONS

(71) Applicant: Luminar Technologies, Inc., Orlando, FL (US)

(72) Inventors: John E. McWhirter, Winter Park, FL (US); Allen Gabriele, Winter Springs, FL (US)

(73) Assignee: Luminar Technologies, Inc., Orlando, FL (US)

( * ) Notice: Subject to any disclaimer, the term of this patent is extended or adjusted under 35 U.S.C. 154(b) by 0 days.

(21) Appl. No.: 16/027,944

(22) Filed: Jul. 5, 2018

(51) Int. Cl.
*G01S 7/48* (2006.01)
*G01S 7/481* (2006.01)
*G01S 17/58* (2006.01)

(52) U.S. Cl.
CPC .......... *G01S 7/4813* (2013.01); *G01S 7/4817* (2013.01); *G01S 7/4818* (2013.01); *G01S 17/58* (2013.01)

(58) Field of Classification Search
USPC ........................................................ 356/5.01
See application file for complete search history.

(56) References Cited

U.S. PATENT DOCUMENTS

| | | | | |
|---|---|---|---|---|
| 6,414,746 B1* | 7/2002 | Stettner | .................. | G01S 7/4816 250/332 |
| 7,190,441 B1* | 3/2007 | McWhirter | .......... | G01N 1/2813 356/36 |
| 8,797,512 B2* | 8/2014 | Stettner | .................. | G01S 17/06 244/183 |
| 8,804,101 B2* | 8/2014 | Spagnolia | ............... | G01S 17/89 250/332 |
| 9,915,726 B2* | 3/2018 | Bailey | ...................... | G01S 7/481 |
| 2005/0180149 A1* | 8/2005 | Albou | .................. | B60Q 1/0023 362/459 |
| 2012/0154785 A1* | 6/2012 | Gilliland | ............... | G01S 7/4813 356/5.01 |
| 2013/0128257 A1* | 5/2013 | Stettner | .................. | G01S 17/06 356/4.01 |
| 2013/0242283 A1* | 9/2013 | Bailey | ...................... | G01S 17/89 356/4.01 |
| 2016/0202282 A1* | 7/2016 | Maryfield | ............... | G01S 17/58 356/28 |
| 2016/0266242 A1* | 9/2016 | Gilliland | ............... | G01S 7/4814 |
| 2018/0107221 A1* | 4/2018 | Droz | ................... | G05D 1/0088 |
| 2018/0284268 A1* | 10/2018 | McWhirter | | |
| 2018/0284780 A1* | 10/2018 | McWhirter | ............ | G05D 1/024 |

* cited by examiner

*Primary Examiner* — James R Hulka

(57) ABSTRACT

A transceiver for use in a lidar system includes an optical receiver and a transmitter. The optical receiver includes a circuit board including a detector, a cylindrical inner housing, a C-shaped outer housing that partially surrounds the inner housing, and a lens in the outer housing. The transmitter includes an optical fiber coupled to a light source and a collimator, and a pair of Risley prism rods for adjusting collimator alignment. The collimator and Risley rods sit in a groove formed by the inner housing and the outer housing. A lidar system using the transceiver and a transceiver assembly method are disclosed.

30 Claims, 12 Drawing Sheets

TRANSCEIVER APPARATUS, METHOD AND APPLICATIONS

BACKGROUND

Aspects and embodiments disclosed herein below generally relate to lidar systems; more particularly to a transceiver for a lidar system; most particularly to transmitter and/or receiver components, methods of assembly and alignment, and applications of use.

Light detection and ranging (lidar) is a technology that can be used to measure distances to remote targets. Typically, a lidar system includes a transceiver comprising a transmitter and a receiver. The transmitter sends out an electromagnetic (EM) signal (e.g., a beam of laser light having a particular operating wavelength) that reflects and/or scatters from an object (target). The operating wavelength of a lidar system may lie, for example, in the infrared, visible, or ultraviolet portions of the EM spectrum. Some of the scattered/reflected light is received back at the receiver. The system determines the distance to the object based on one or more characteristics associated with the received light; for example, the lidar system may determine the distance to the object based on the time of flight for a pulse of light emitted by the light source to travel to the object and back to the lidar system.

A lidar transceiver may also include a collimator to transmit a collimated beam of radiation to the object. As is well known, a collimator must be carefully and properly aligned to function as intended. Once the collimator is aligned, alignment must be maintained in a dynamic environment that includes, e.g., temperature changes and other environmental conditions that may cause misalignment of the collimator over time or during use.

The inventors have recognized the advantages and benefits of a transceiver having reduced complexity, optimal performance, ease of alignment, alignment stability, and other attributes as provided by the aspects and embodiments described and claimed herein.

SUMMARY

An aspect of the invention is directed to a transceiver for use in a lidar system. In a non-limiting, exemplary embodiment the transceiver includes an optical receiver that comprises a circuit board including a detector configured to detect received light; an inner housing having a first end attached to the circuit board and an opposing second end, wherein the inner housing encompasses the detector; an outer housing that at least partially surrounds the inner housing; and a lens disposed in the outer housing adjacent the second end of the inner housing. In various additional embodiments the transceiver may include one or more of the following limitations, components, characteristics, and/or attributes, alone or in various combinations as a person having ordinary skill in the art (PHOSITA) would understand:
wherein the inner housing is a hollow cylinder, wherein the first end of the inner housing is centered about the detector;
wherein the outer housing is a partial, elongate, hollow cylinder having a C-shaped cross section;
wherein the outer housing has an inner diameter that is up to 2% larger than an outer diameter of the inner housing;
wherein the outer housing is slidably engageable over at least a portion of the inner housing;
wherein the circuit board, the inner housing, the outer housing, and the lens are characterized by substantially equal coefficients of thermal expansion;
further comprising a window hermetically attached to the second end of the inner housing, wherein the circuit board, the inner housing, and the window form a hermetically sealed volume that encloses the detector;
wherein a fluid is disposed within the hermetically sealed volume, wherein the fluid is at least one of an inert gas and dry air having a moisture content less than 2%;
wherein the detector is bonded to an integrated circuit that is attached to the circuit board;
wherein the detector is an avalanche photodiode (APD);
further comprising an optical filter having a selected transmission bandwidth;
further comprising a transmitter configured to produce a transmission beam, comprising a transmission beam propagation medium; and a collimator coupled to an output of the transmission beam propagation medium, wherein the detector is configured to detect a portion of the transmission beam that is incident on and scattered by an object external to the transceiver assembly;
further comprising a transmission beam alignment component;
wherein the transmission beam alignment component is a prismatic component;
wherein the prismatic component includes a Risley prism;
wherein the prismatic component is a plurality of Risley prism rods linearly disposed adjacent an output end of the collimator;
wherein the transmission beam alignment component is a collimator holder connected to a portion of the outer housing;
wherein the collimator holder has an opening/receptacle into which the collimator can be disposed in an adjustable manner;
wherein the opening has a tapered volume;
wherein the tapered volume provides at least one pivot collimator alignment point in contact with the collimator;
wherein the collimator is disposed in an elongate groove or shelf formed along a longitudinal intersection of the inner housing and the outer housing;
wherein the transmission beam propagation medium is an optical fiber;
wherein the transmission beam comprises pulses of light having a wavelength between 1400 nanometers and 1600 nanometers; a pulse energy of less than 10 microjoules; a pulse repetition frequency of less than 10 MHz; and a pulse duration of 0.1 nanoseconds to 100 nanoseconds;
further comprising a second transmitter and a second detector;
wherein the transceiver is part of a lidar system comprising a scanner configured to scan the transmission beam across a field of regard of the lidar system.

An aspect of the invention is directed to a transceiver assembly method. In a non-limiting, exemplary embodiment the transceiver assembly method includes the steps of providing a circuit board including a light-sensitive detector; providing an inner housing having a first end and an opposing second end; providing an outer housing that is sized and shaped to at least partially surround the inner housing; providing a lens; attaching the inner housing to the circuit board at the first end in a manner to encompass the detector; installing the lens into the outer housing, whereupon assembly, the lens is configured to focus a received light onto the detector; sliding the outer housing over a portion of the inner housing; translating the outer housing to a location such that the lens will focus the received light onto the detector; and affixing the outer housing to the inner housing. In various additional embodiments the transceiver assembly method may include one or more of the following steps, limitations, components, characteristics, and/or attributes, alone or in various combinations as a PHOSITA would understand:

further comprising attaching a window to the second end of the inner housing, wherein the circuit board, the inner housing, and the window form a hermetically sealed volume that encloses the detector;

further comprising providing a collimator and a collimator alignment receptacle attached to the outer housing, wherein the collimator alignment receptacle has an opening into which the collimator can be slidingly engaged; aligning the collimator; and affixing the collimator in the alignment receptacle;

wherein the alignment receptacle opening has a tapered volume that provides at least one pivot collimator alignment point; and pivoting the collimator about the at least one pivot collimator alignment point;

further comprising providing a collimator and a plurality of Risley prism rods; disposing the collimator and the plurality of Risley prism rods in an elongate groove (or shelf) formed along a longitudinal intersection of the inner housing and the outer housing; rotating at least one of the Risley prism rods for aligning a transmission output from the collimator; and affixing the aligned collimator and Risley prism rods in the elongate groove.

DESCRIPTION OF EXEMPLARY, NON-LIMITING EMBODIMENTS

Figure 1:
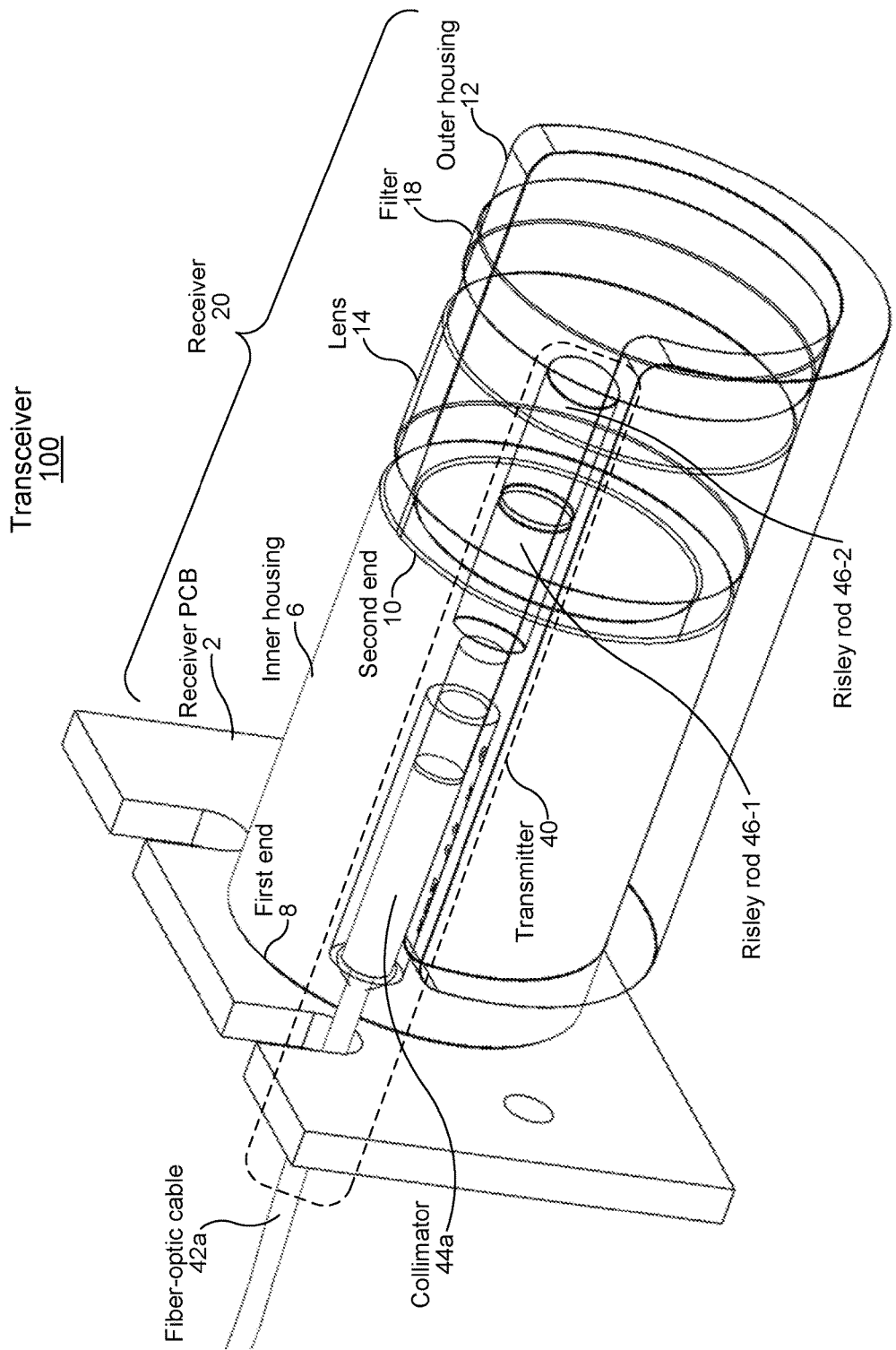
FIG. 1 shows a perspective, cut-away view of a transceiver, according to an exemplary, non-limiting embodiment of the invention.
Figure 7:
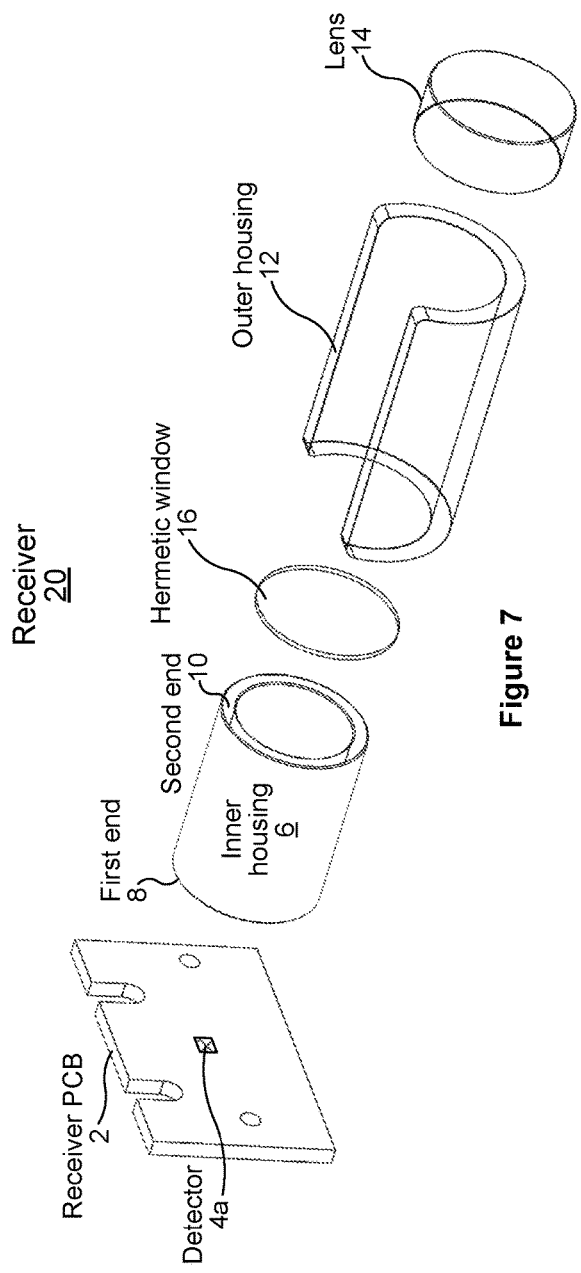
FIG. 7 shows a perspective assembly view of the receiver of FIG. 5.

FIG. 1 illustrates an exemplary aspect of a transceiver 100 that includes a receiver 20 and a transmitter 40. With further reference to FIG. 7 receiver 20 is made up of a circuit board 2 including a detector 4a configured to detect a received signal, an inner housing 6 having a first end 8 and an opposing second end 10, an outer housing 12, and a lens 14 disposed in the outer housing adjacent the second end of the inner housing. As used herein, the lens 14 being adjacent the second end 10 may refer to the lens 14 being in contact with or located near the second end 10. As an example, the surface of the lens facing the second end 10 of the inner housing 6 may be located from 0.5 mm to 10 mm from the second end.

It will be appreciated that appropriate circuitry interconnects the circuit board, detector(s), and other components. While operation of the embodied transceiver will occur over selected bandwidths of the optical spectrum, the invention is not so limited as operation may occur over selected portions of the entire electromagnetic (EM) spectrum. In this regard, the term 'light' will be used herein to refer to the radiation transmitted by the transceiver and the radiation received by the transceiver. In an advantageous embodiment, transmission light from the transceiver will comprise pulses of light having a wavelength between 1200 nanometers (nm) and 1700 nm, a pulse energy of less than 10 microjoules, a pulse repetition frequency of less than 10 MHz, and a pulse duration of 0.1 nanoseconds (ns) to 100 ns. Accordingly, the receiver integrated circuit (IC) can include a transimpedance amplifier, voltage amplifier, electronic filter(s), comparators, time-to-digital converters (TDCs), and/or analog-to-digital converters (ADCs). Although the receiver is described as an integrated circuit, the receiver may instead comprise discrete components or ICs. The detector can be an avalanche photodiode (APD), and the receiver IC can be a ROIC (readout integrated circuit, also known as an ASIC (application-specific integrated circuit)). The APD is bonded to the ROIC, and the ROIC is attached to the receiver printed circuit board (PCB).

Figure 4A:
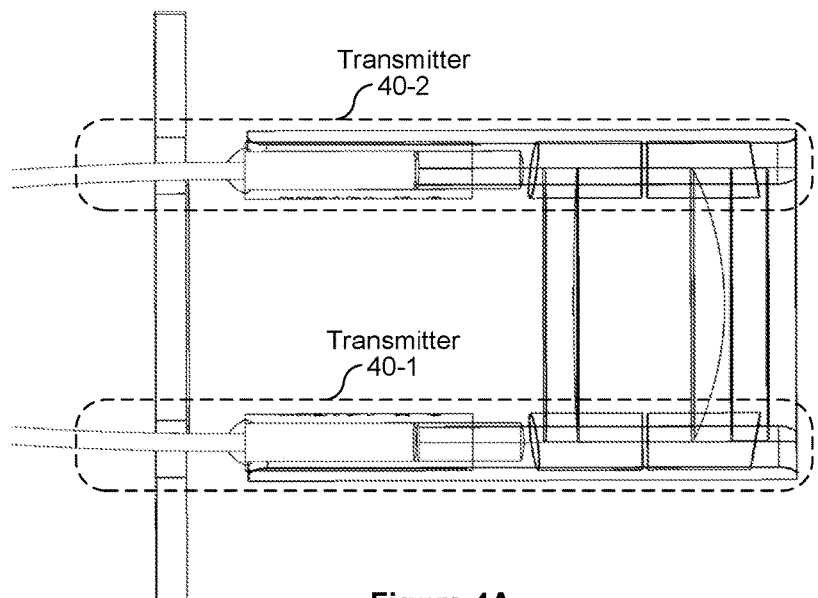
FIG. 4A shows a top plan view and FIG. 4B shows a front cross-sectional view of the transceiver of FIG. 2.
Figure 4B:
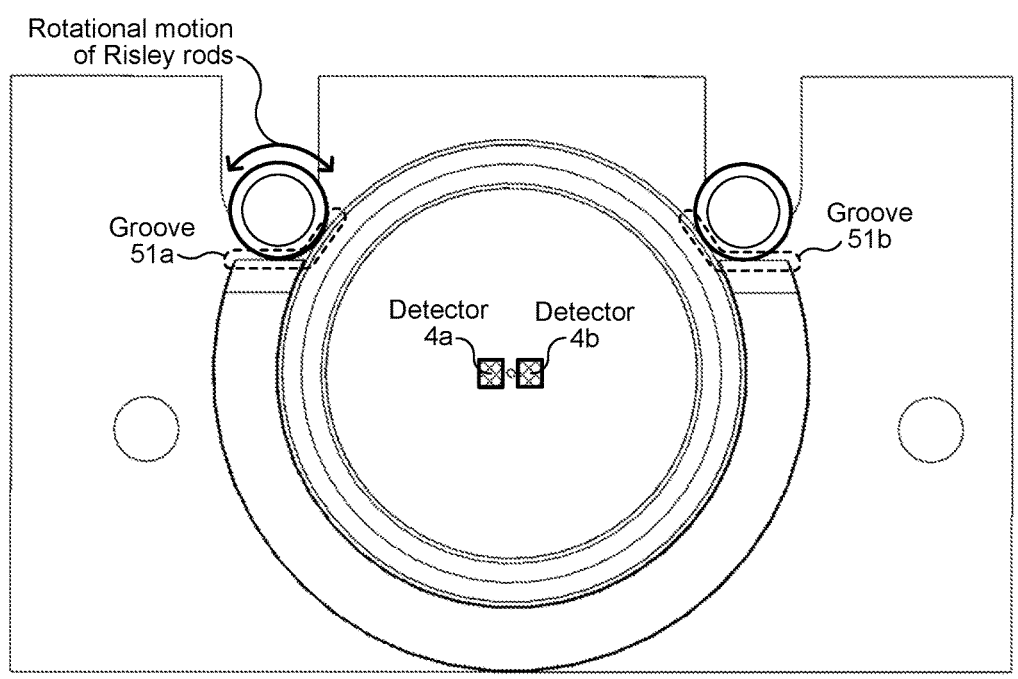

Referring again to FIG. 7, the inner housing 6 is a hollow cylinder and upon assembly the first end 8 of the inner housing is centered about the detector 4a (see FIG. 4B). The outer housing 12 is a partial, elongate, hollow cylinder having a C-shaped cross section. A C-shaped cross section may refer to the cross section of the outer housing 12 having the shape of an arc of a circle (e.g., a circular shape with an opening, similar to the shape of a capital letter "C"). The outer housing 12 has an inner diameter that is up to 2% larger than an outer diameter of the inner housing 6. This allows the outer housing to slidingly engage the inner housing in a desired configuration. The transceiver further includes a lens 14 disposed in the outer housing. In FIG. 7, the inner housing 6, the outer housing 12, and the lens 14 each have a circular cross-sectional shape. In other embodiments, the inner housing 6, the outer housing 12, and the lens 14 may have any suitable cross-sectional shape, such as for example, a square, rectangular, or polygonal cross-sectional shape. As an example, the inner housing may have a square cross-sectional shape, and the outer housing may have a square cross-sectional shape with an opening along a longitudinal axis. Additionally, the lens 14 may have a square cross-sectional shape configured to fit into the square-shaped interior of the outer housing 12.

In FIG. 7, the receiver includes two housing parts (inner housing 6 and outer housing 12) that are configured to slidingly engage together. In other embodiments, the housing may include a single part (e.g., inner housing 6 and outer housing 12 are constructed as a single part having a hollow cylinder and a circular or C-shaped cross section of larger diameter at least partially surrounding the hollow cylinder). One end of the housing may be affixed to the receiver PCB 2, and the lens may be positioned within the housing near the opposite end. The interior of the housing may include a hard stop for locating the lens 14 (e.g., the lens slides into the housing until it contacts the hard stop, and then the lens may be fixed in place with epoxy). Alternatively, the lens may be actively positioned within the housing (e.g., the lens may be moved back and forth within the interior of the housing until the lens is located to focus input light onto the detector 4*a*, and then the lens may be epoxied in place).

According to an exemplary method embodiment, the assembly of the receiver 20 is as follows:

Step 1) Inner housing 6 is attached to the receiver PCB 2 (which includes the ROIC and APD);

Step 2) Lens 14 is installed into and attached to the outer housing 12 (e.g., using UV-cure epoxy);

Step 3) Outer housing 12 is sleeved over the inner housing 6;

Step 4) The lens 14 is focused for the detector by translating the outer housing 12 to the desired position;

Step 5) When the lens 14 is properly positioned, the outer housing 12 is fixedly attached to the inner housing 6 (e.g., using UV-cure epoxy).

The resulting receiver assembly is solid and robust with the attached parts forming a single, sturdy assembly. Advantageously, the circuit board, the inner housing, the outer housing, and the lens may be characterized by substantially equal coefficients of thermal expansion. As used herein, 'substantially equal' will be understood by a PHOSITA to mean that the transceiver will not go out of alignment or deviate from optimal performance due to environmental temperature changes. For example, the inner housing and outer housing may be made of a glass or ceramic material that matches the coefficient of thermal expansion (CTE) of the glass lens. Additionally, the PCB can be made from a ceramic material (rather than an epoxy-based circuit-board material such as FR-4), where the ceramic material has a CTE close to that of the lens and the inner and outer housings. Using materials with matching CTEs can advantageously (1) minimize the optical misalignment caused by temperature changes and (2) ensure that the parts expand uniformly when the temperature changes, which can prevent cracking or failure caused by thermal stress.

According to an embodiment, the receiver may also include a window 16 attached to the second end 10 of the inner housing 6 in a manner to form a hermetic seal, wherein the circuit board, the inner housing, and the window form a hermetically sealed volume that encloses the detector. A fluid may be disposed within the hermetically sealed volume. The fluid may be an inert gas, dry air (e.g., having a moisture content from zero to 2%), or a mixture of inert gas and dry air. Hermetic sealing can (1) prevent problems with dust blocking the detector (which may occur if the detector is not sealed), and (2) prevent condensation on the detector package or window (which is undesirable because condensation could block or attenuate incident light). The PCB (including the APD and ROIC) may be actively cooled (e.g., with a thermoelectric cooler attached to the back of the PCB), and if the APD is not sealed, condensation could occur due to the temperature difference between the APD and the surrounding environment.

A filter 18 may also be installed into the outer housing 12 adjacent the lens 14. The filter may be a separate optical element located some distance from the lens (e.g., 0.5 mm to 10 mm from the lens), or the filter may be combined with the lens 14 or window 16 (e.g., the filter may be attached to the lens or window, or the filter may be a dielectric coating deposited onto a surface of the lens or window). The filter can be, e.g., a bandpass filter that transmits light at the operating wavelength of the light source (e.g., 1550 nm) and reflects or absorbs other wavelengths of unwanted background light (e.g., sunlight, light from car headlights, or light from other lidar systems). Other filter types as known in the art may be appropriate as a PHOSITA would understand.

Figure 12:
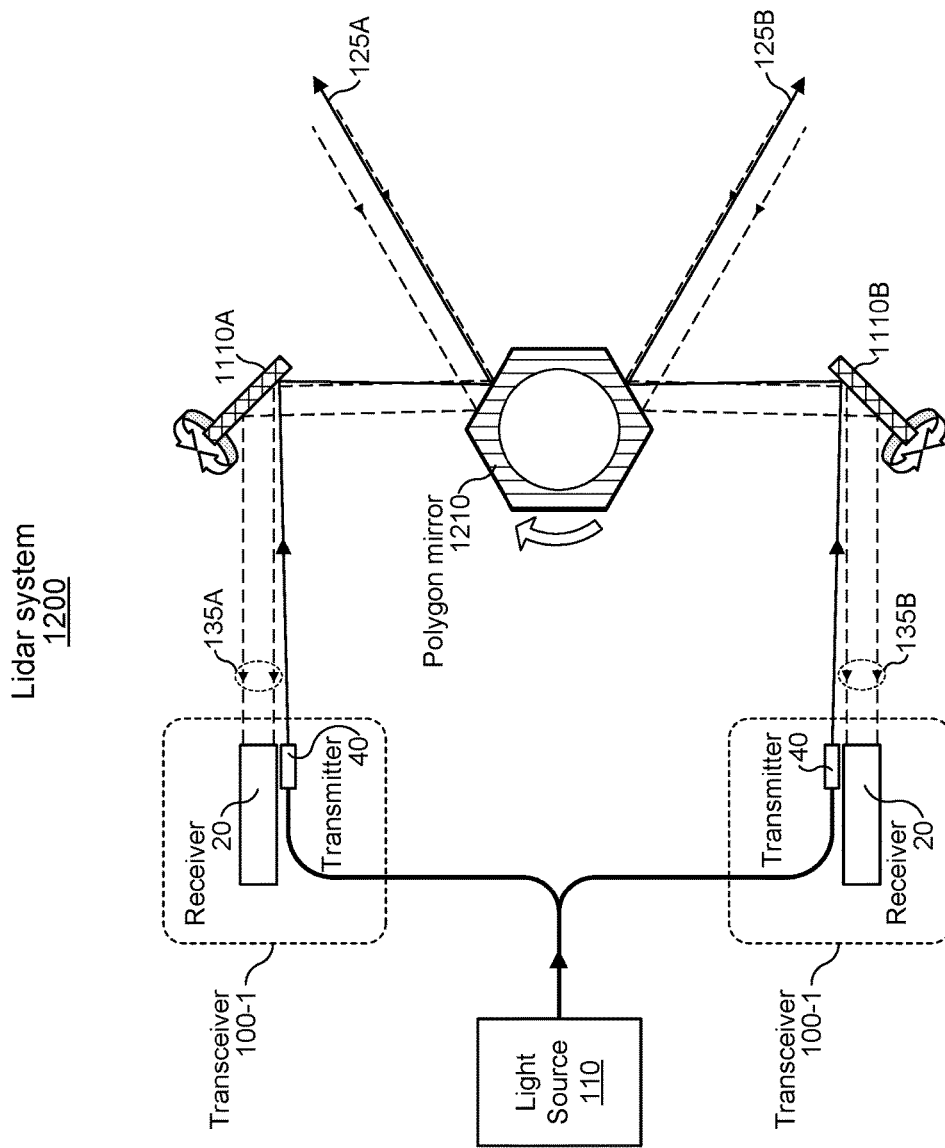
FIG. 12 schematically illustrates a lidar system according to an exemplary, non-limiting embodiment of the invention.
Figure 13:
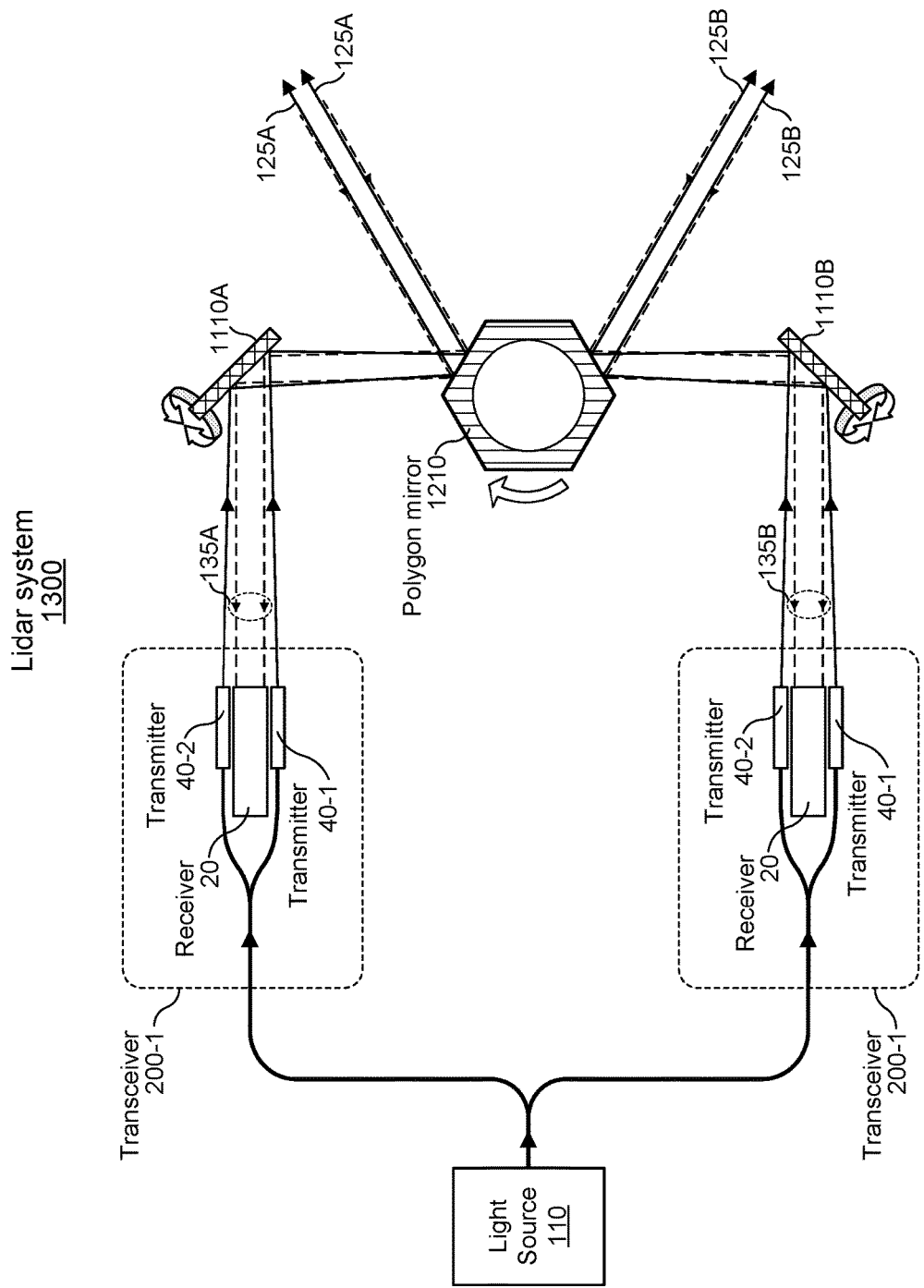
FIG. 13 schematically illustrates a lidar system according to an exemplary, non-limiting embodiment of the invention.

An aspect of the transceiver 100 further includes a transmitter 40 (FIG. 8) configured to produce a transmission beam via a source 110 (FIGS. 12, 13; e.g., laser or other known source to produce desired transmission bandwidth). The transmitter includes a transmission beam propagation medium such as, but not limited to, a fiber-optic cable 42*a* (which may be referred to as an optical fiber or a fiber-optic waveguide) and a collimator 44 coupled to an output of the transmission beam propagation medium. The collimator produces a collimated free-space beam of output light (which, for example, can be scanned across a field of regard of a lidar system). The alignment of the beam of output light may be set by adjusting the angular alignment of the collimator, and then the collimator may be affixed to the inner housing or outer housing. For example, the collimator may be aligned and then attached to the groove (or shelf) 51 formed along a longitudinal intersection of the inner housing and the outer housing. The collimator may be attached using any suitable epoxy or adhesive. The epoxy or adhesive may have a bond thickness of less than 250 micrometers and a variation in bond thickness along the length of the collimator of less than 30%.

The transceiver 200 may further include a transmission beam alignment component.

Figure 9:
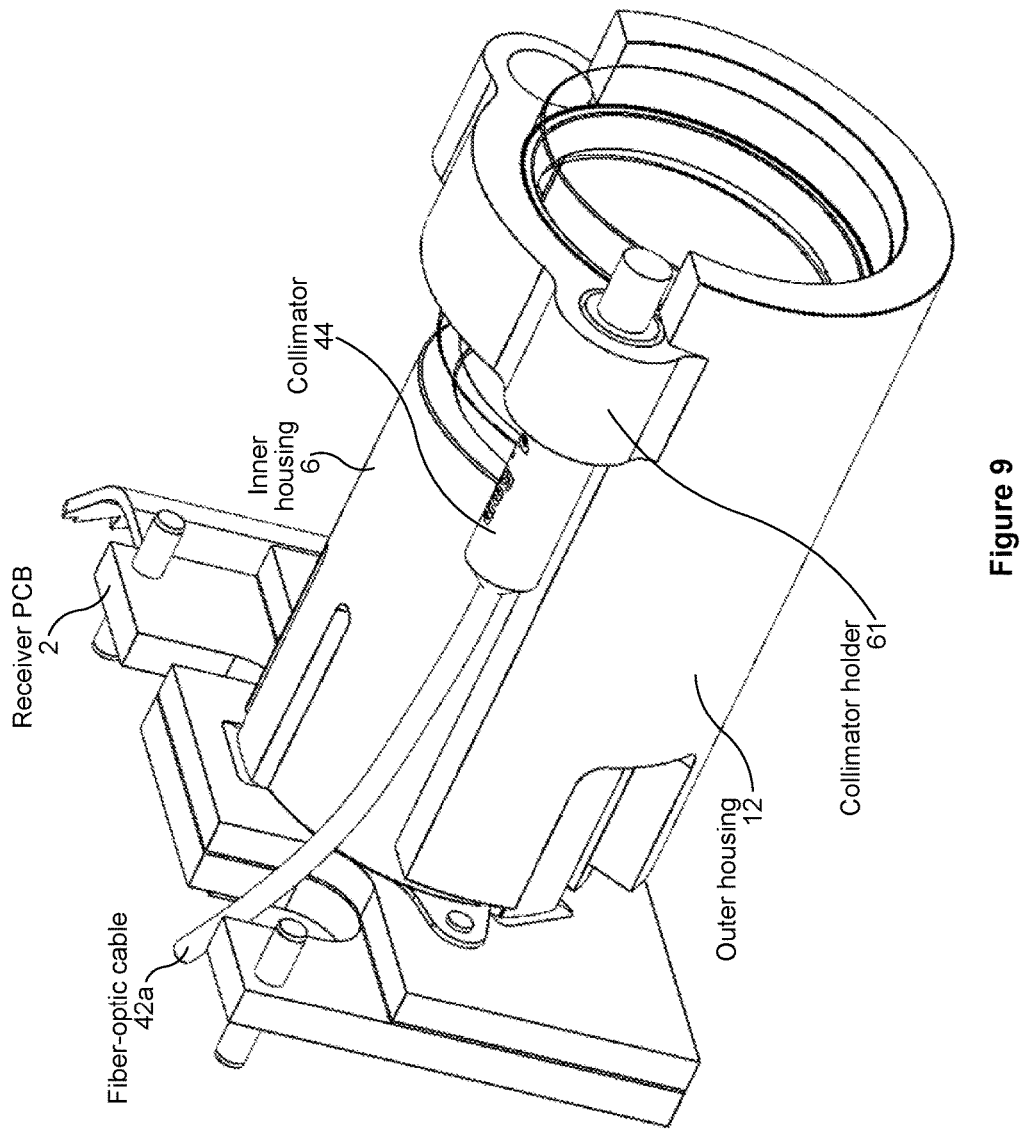
FIG. 9 shows a perspective line view of a transceiver, according to an exemplary, non-limiting embodiment of the invention.
Figure 10:
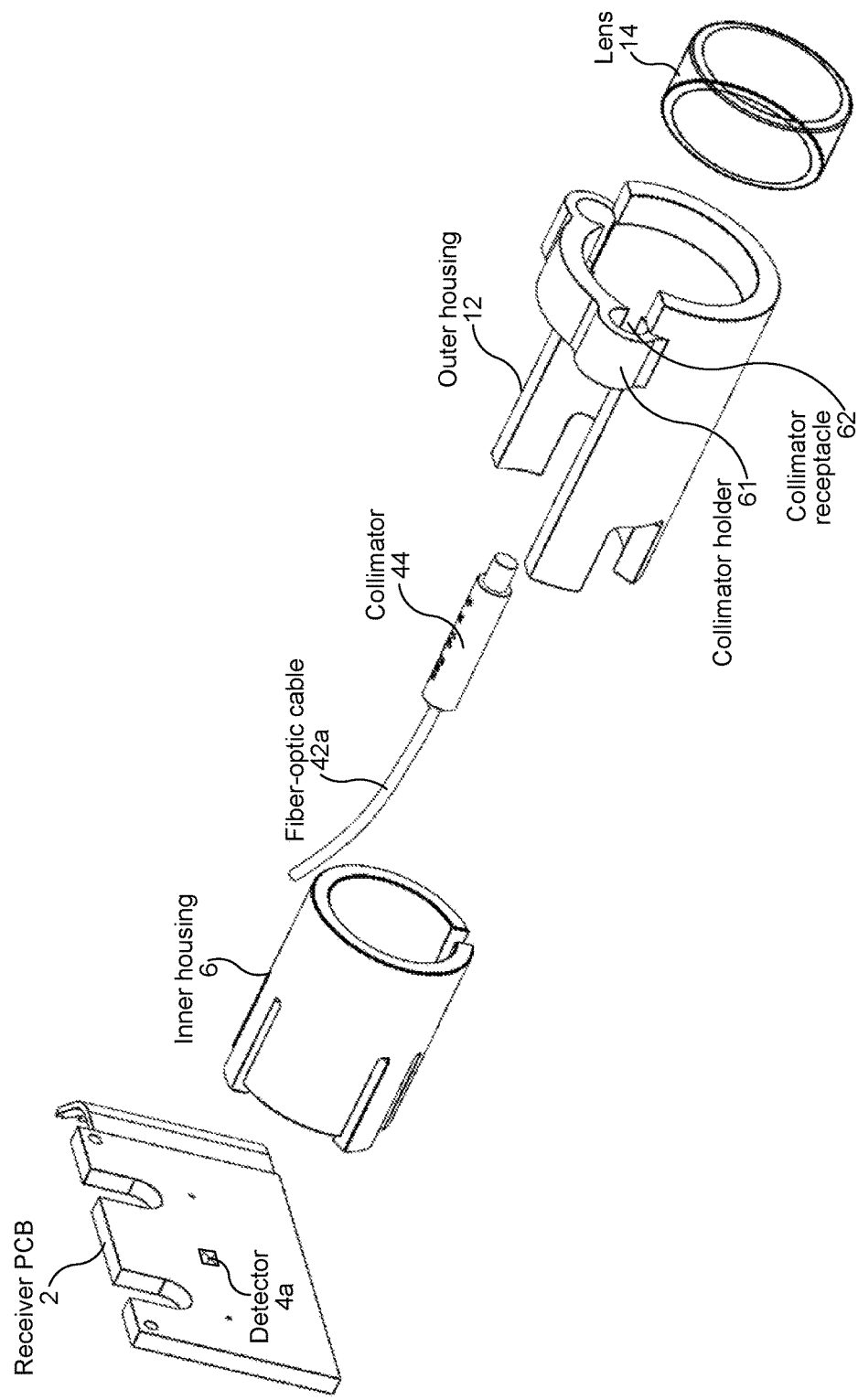
FIG. 10 shows a perspective assembly view of the transceiver in FIG. 9.
Figure 11:
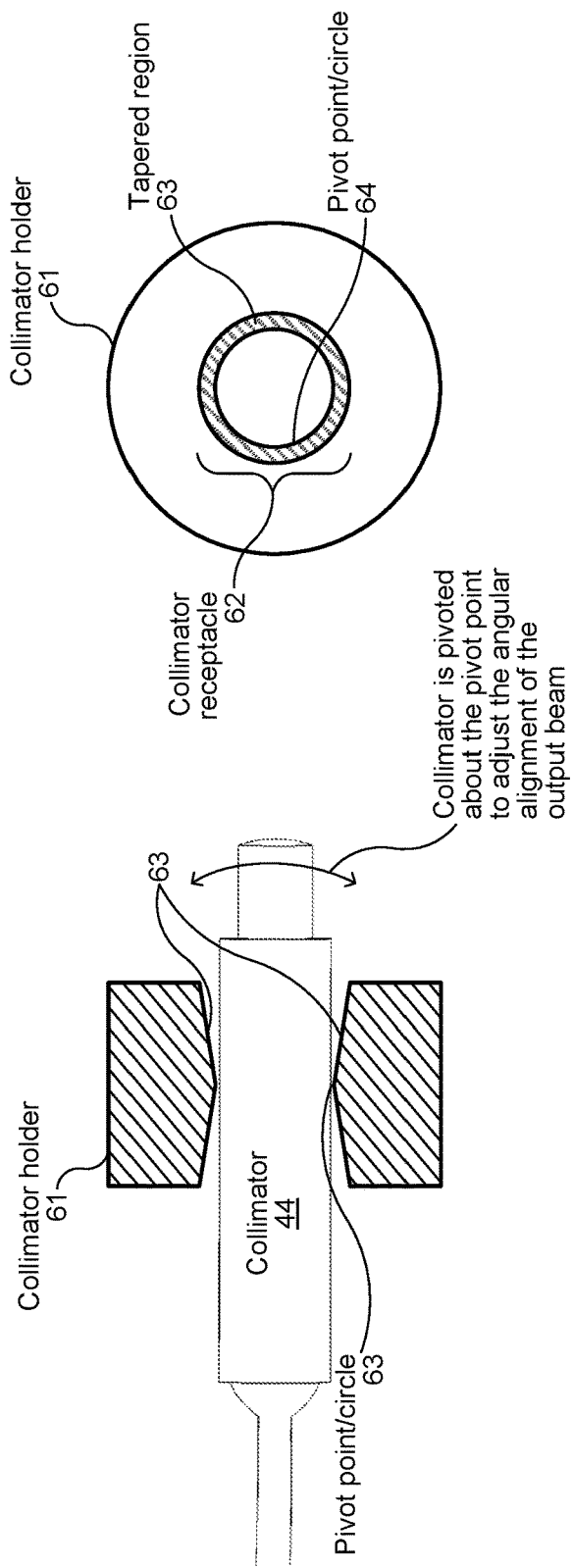
FIG. 11 shows a side cross-sectional view (left) and a front cross-sectional view of an alignment structure of a transmitter, according to an exemplary, non-limiting embodiment of the invention.

In an embodiment illustrated in FIGS. 9-11 the transmission beam alignment component is a collimator holder 61 connected to a portion of the outer housing. The collimator holder has an opening/receptacle 62 into which the collimator can be disposed in an adjustable manner. The opening may have a uniform diameter or, for example, the opening 62 may have a taper 63 to provide a tapered volume which the collimator can slidingly engage. The tapered volume thus provides at least one pivot collimator alignment point 64 in contact with the collimator. The collimator can be pivoted about the pivot point to adjust the alignment of the output beam. (Note, the pivot point may actually be a 'pivot circle' since it extends all around the collimator). Once aligned, the collimator may be epoxied or otherwise secured in the collimator holder.

A collimator may be epoxied in place along all or some significant portion of the length of the collimator. This may produce a large surface area of non-uniform epoxy thickness subject to temperature variations and collimator misalignment due to thermal changes. Advantageously, less surface contact area reduces the amount of adhesive necessary to secure the collimator in place. Moreover, when the collimator is epoxied in place, expansion/contraction is better balanced about the pivot circle.

Figure 5:
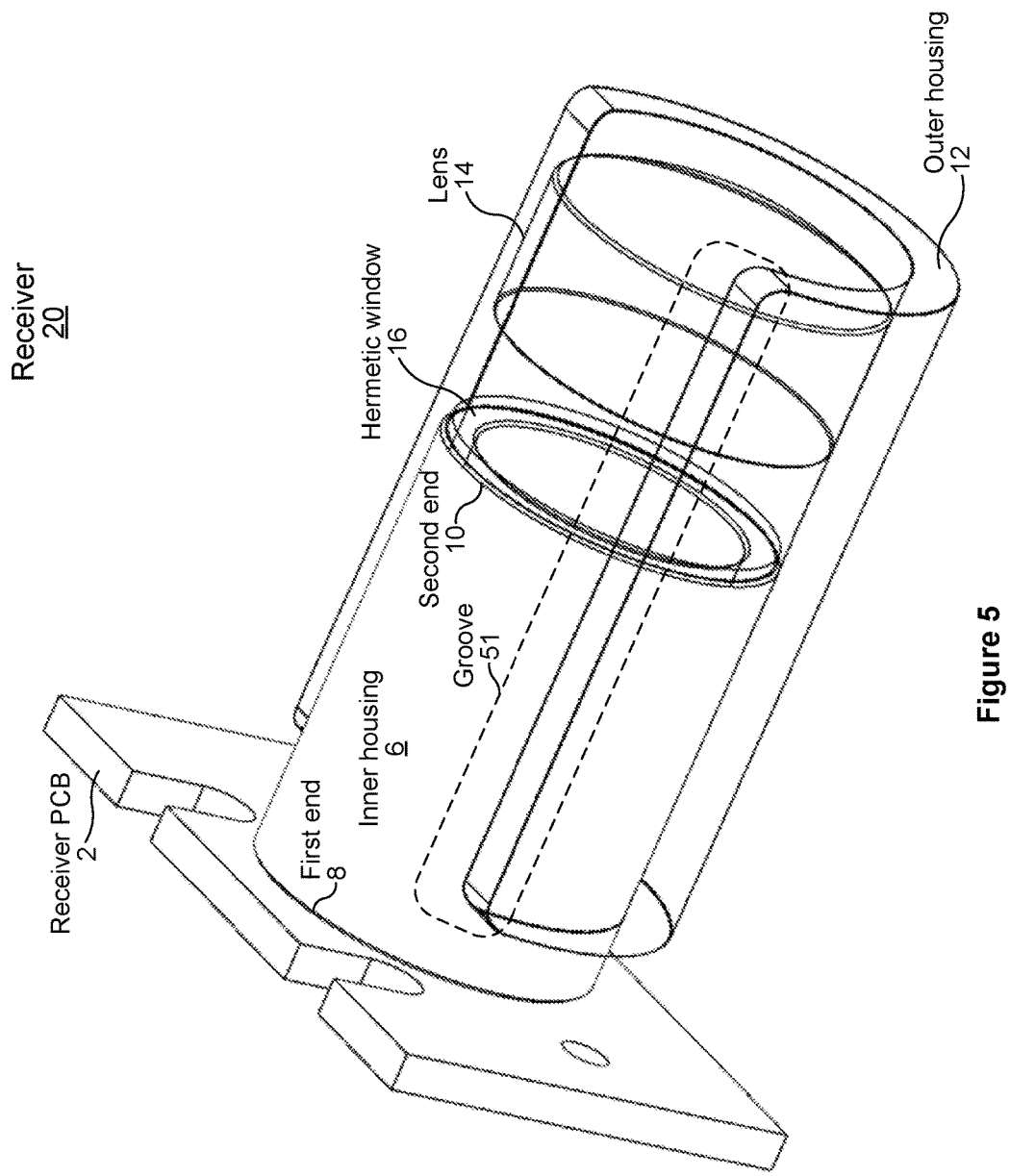
FIG. 5 shows a perspective, cut-away view of a receiver component of a transceiver, according to an exemplary, non-limiting embodiment of the invention.
Figure 6:
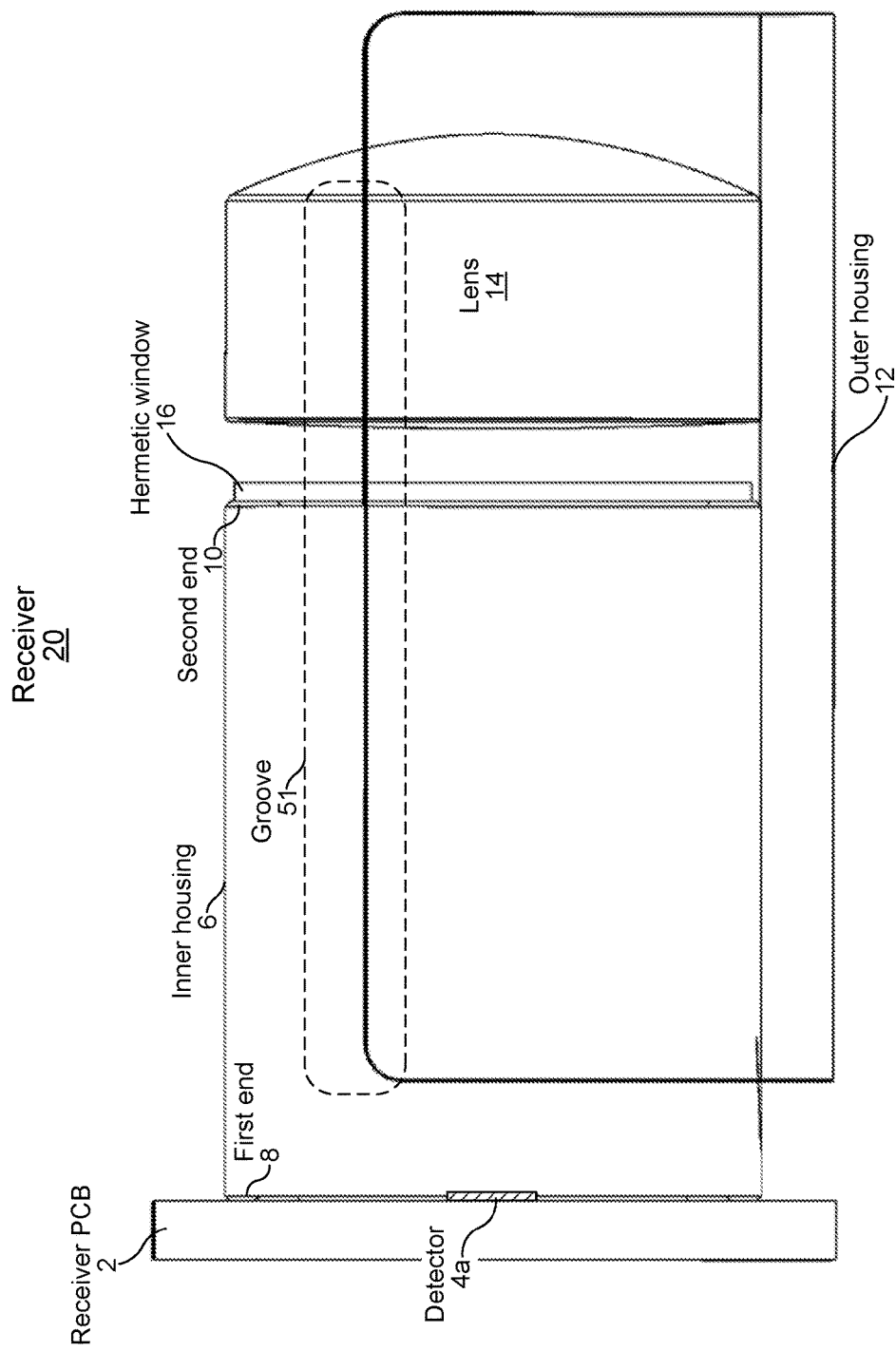
FIG. 6 shows a side cross-sectional view of the receiver of FIG. 5.
Figure 8:
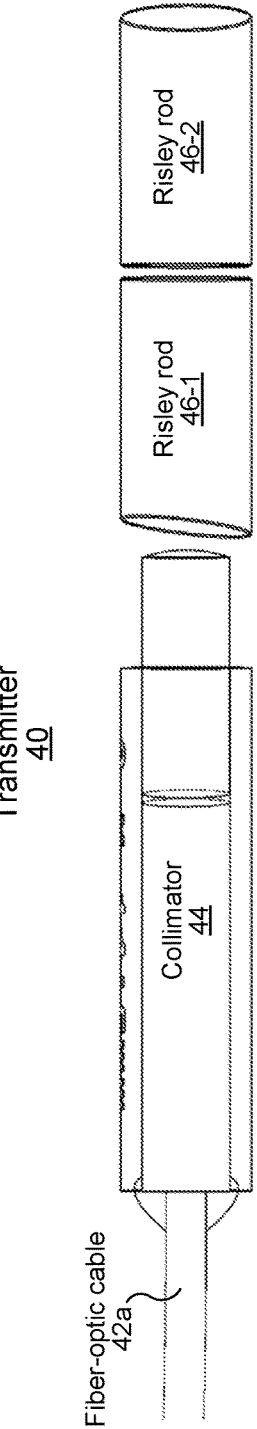
FIG. 8 shows a side cross-sectional view of a transmitter component of a transceiver, according to an exemplary, non-limiting embodiment of the invention.

FIGS. 5, 6, and 8 illustrate a further advantageous embodiment of the invention. When the outer housing is positioned over the inner housing, a groove (or shelf) 51 is formed along a longitudinal intersection of the inner housing and the outer housing. Additionally, a portion of the groove may be formed along a longitudinal intersection of the outer housing and the lens 14 or filter 18. As further shown in FIG. 1, the collimator 44*a* is disposed and appropriately secured in the groove 51. Referring also to FIG. 8, the collimator/output beam alignment component comprises a first Risley prism rod 46-1 and a second Risley prism rod 46-2, which are linearly disposed in the groove 51 adjacent the collimator output. In this embodiment, the collimator is affixed directly to the groove without active alignment. A layer of epoxy is applied, the collimator is seated in the groove, and the epoxy is cured. The epoxy may have a variation in bond thickness along the length of the collimator of less than 10%. Rather than actively aligning the collimator, the alignment of the output beam is provided by the pair of Risley rods (aka Risley prisms, or wedged prisms). The Risley rods are also seated in the groove and the output beam from the collimator passes through the rods. The angular adjustment of the output beam is provided by rotating the rods (e.g., applying a roll motion about the longitudinal axis of the rods). For example, a mechanical stage with a friction tool (e.g., a rubber tip) can be used to precisely adjust the rotational orientation of each Risley rod. When the rods are oriented properly, epoxy is applied and cured and the friction tool is removed. Advantageously, the epoxy thickness along the length of the collimator tube is more uniform than if the collimator is actively aligned. This epoxy uniformity may help to reduce the amount of beam misalignment with temperature variation. Additionally, the Risley-rod design provides for a relatively low sensitivity of the output beam alignment to temperature changes since the deflection angle provided by a Risley rod is relatively insensitive to angle and transverse position. If the collimator or a Risley rod moves (e.g., due to a temperature change), the angular alignment of the output beam may not be significantly affected. The output beam may experience a small transverse motion, but for this transceiver system, lateral beam motions are not too problematic relative to angular misalignment. Thirdly, the embodied assembly technique lends itself to being performed by an automated alignment system.

A Risley prism rod may include a cylinder of glass material with flat input and output surfaces, where the input and output surfaces are non-parallel. The input and output surfaces may include a dielectric coating (e.g., an anti-reflection coating to reduce the reflectivity of the surfaces). A Risley prism rod may have a diameter of 2-6 mm and a length of 3-15 mm. The input and output surfaces may have a wedge angle between the surfaces of approximately 0.5-8 degrees. For an incident optical beam that travels through a Risley prism rod approximately parallel to the rod's longitudinal axis, the wedge angle provides for beam steering along an angular cone as the rod is rotated about its axis. For two rods in series, the output beam can be steered to any desired angle within the angular cone as the two rods are rotated.

The instant aforementioned transceiver embodiment may be referred to as 'one beam per eye' because there is a single transmitter.

Figure 2:
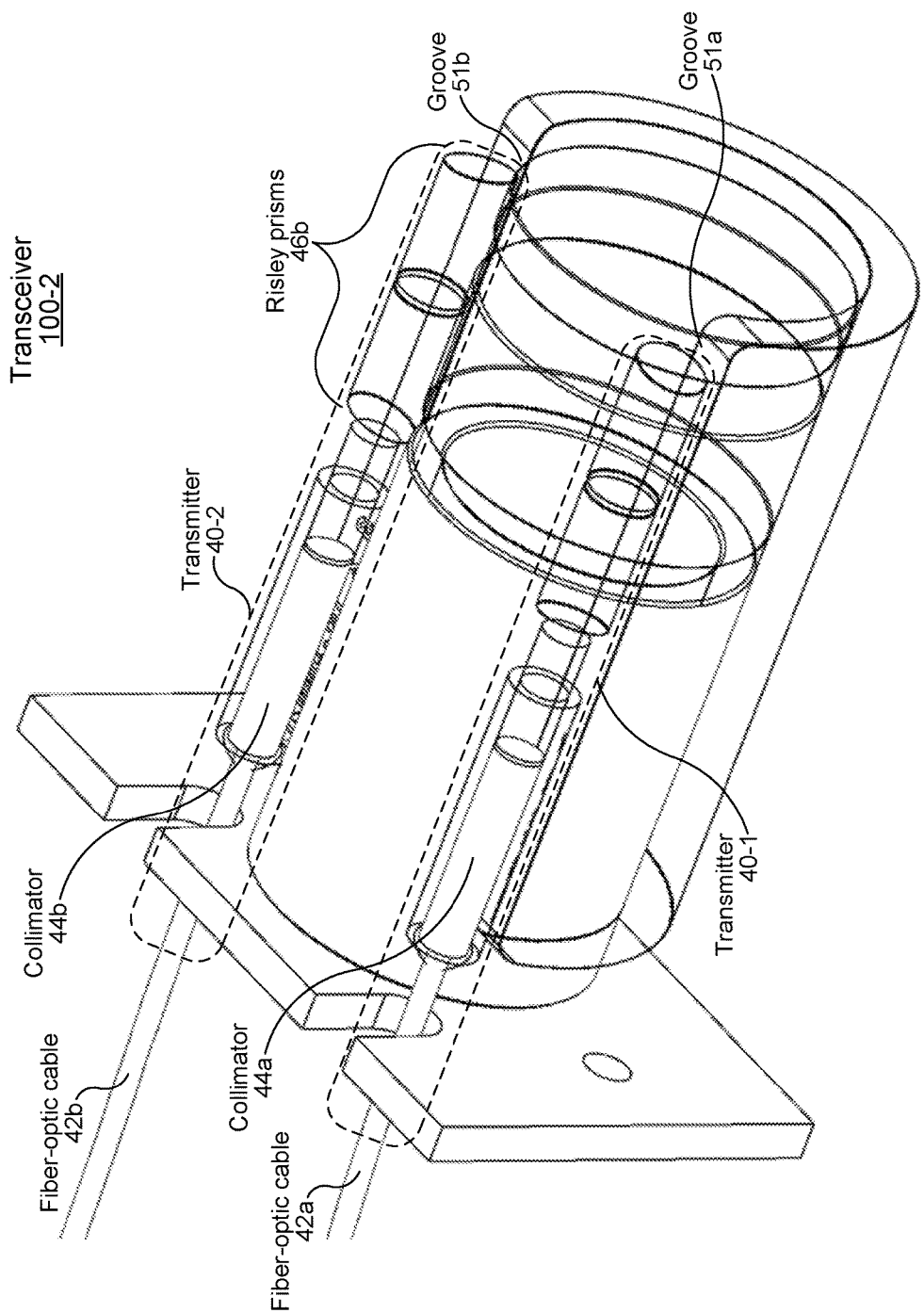
FIG. 2 shows a perspective, cut-away view of a transceiver, according to another exemplary, non-limiting embodiment of the invention.
Figure 3:
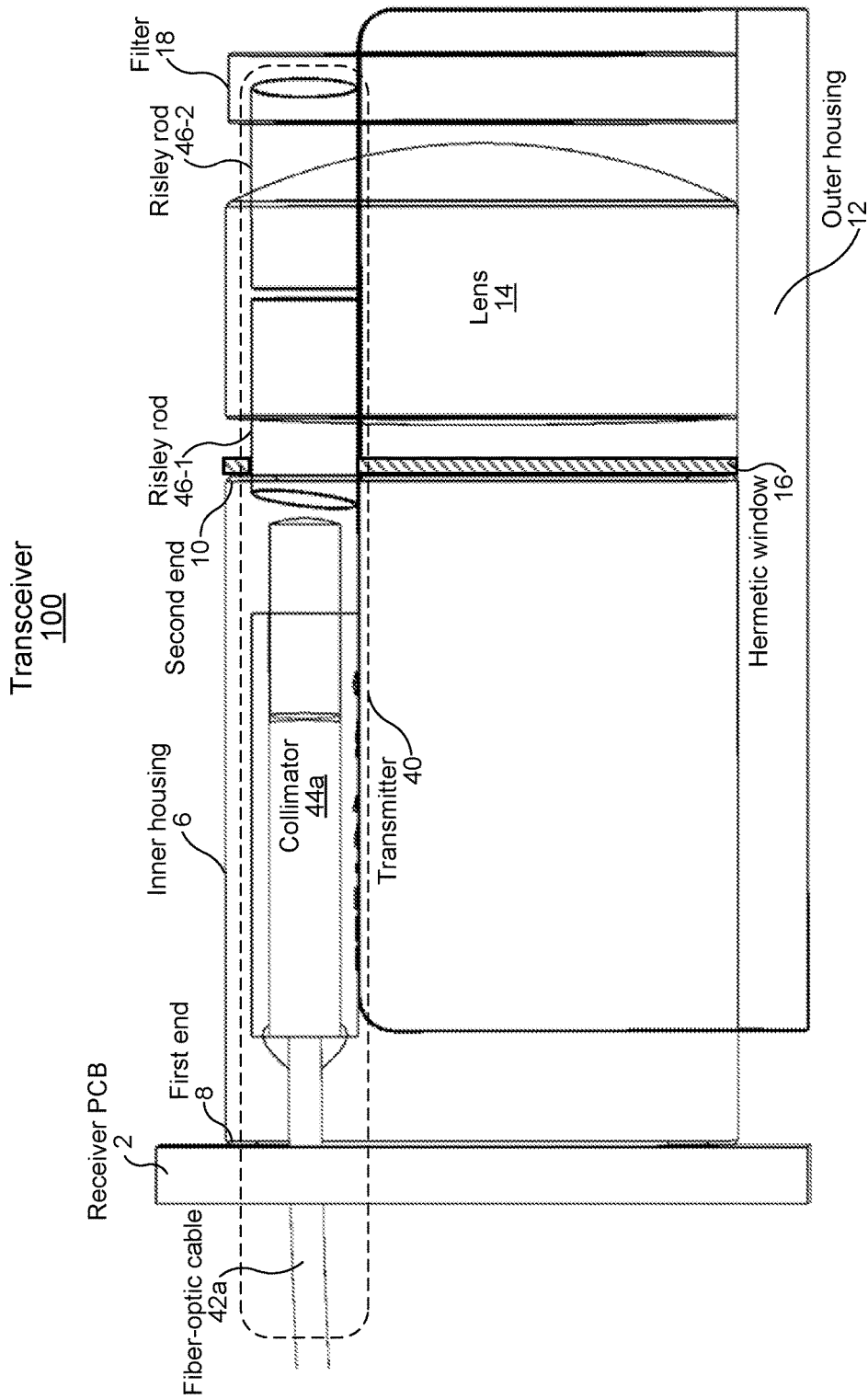
FIG. 3 shows a side cross-sectional view of the transceiver of FIG. 1.

In a related embodiment referred to as 'two beams per eye,' illustrated in FIGS. 2 and 4A, 4B the transceiver 100-2 includes a second transmitter 40-2 and a second detector 4*b* (in addition to the first transmitter 40-1 and first detector 4*a*). The second transmitter 40-2 may include a separate, second source (not shown), second fiber optic waveguide 42*b*, second collimator 44*b*, and second Risley prism rod pair 46*b*, with the collimator and Risley rods disposed in a groove 51*b*. The components of the first transmitter 40-1 may be disposed in groove 51*a*.

FIGS. 12 and 13 schematically illustrate two eye-one beam and two eye-two beam lidar systems 1200, 1300, respectively. Both figures show a common light source 110 coupled to left-eye and right-eye transceivers 100-1, 200-1. Output beams are transmitted to rotating polygon mirror 1210 via scanning mirrors 1110A, 1110B. The solid lined arrows show the field of view of the transmitted light 125A, 125B which is scanned across a field of regard by pivoting mirrors 1110A, 1110B and rotating the polygon mirror 1210. Upon reflection/scatter from an object in the field of view, the reflected/scattered light 135A, 135B returns back to the receivers.

In particular embodiments, certain features described herein in the context of separate implementations may also be combined and implemented in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

What is claimed is:

1. A transceiver, comprising:
an optical receiver comprising:
a circuit board including a detector configured to detect received light;
an inner housing having a first end attached to the circuit board and an opposing second end, wherein the inner housing encompasses the detector;
an outer housing that at least partially surrounds the inner housing, wherein an elongate groove or shelf is formed along a longitudinal intersection of the inner housing and the outer housing; and
a lens disposed in the outer housing adjacent the second end of the inner housing.

2. The transceiver of claim 1, wherein the inner housing is a hollow cylinder, wherein the first end of the inner housing is centered about the detector.

3. The transceiver of claim 1, wherein the outer housing is a partial, elongate, hollow cylinder having a C-shaped cross section.

4. The transceiver of claim 1, wherein the outer housing has an inner diameter that is up to 2% larger than an outer diameter of the inner housing.

5. The transceiver of claim 1, wherein the outer housing is slidably engageable over at least a portion of the inner housing.

6. The transceiver of claim 1, wherein the circuit board, the inner housing, the outer housing, and the lens are characterized by substantially equal coefficients of thermal expansion.

7. The transceiver of claim 1, further comprising a window hermetically attached to the second end of the inner housing, wherein the circuit board, the inner housing, and the window form a hermetically sealed volume that encloses the detector.

8. The transceiver of claim 7, wherein a fluid is disposed within the hermetically sealed volume, wherein the fluid is at least one of an inert gas and dry air having a moisture content less than or equal to 2%.

9. The transceiver claim 1, wherein the detector is bonded to an integrated circuit that is attached to the circuit board.

10. The transceiver of claim 1, wherein the detector is an avalanche photodiode (APD).

11. The transceiver of claim 1, further comprising an optical filter having a selected transmission bandwidth.

12. The transceiver of claim 1, further comprising:
a transmitter configured to produce a transmission beam, comprising:
a transmission beam propagation medium; and
a collimator coupled to an output of the transmission beam propagation medium,
wherein the detector is configured to detect a portion of the transmission beam that is incident on and scattered by an object external to the transceiver assembly.

13. The transceiver of claim 12, further comprising a transmission beam alignment component.

14. The transceiver of claim 13, wherein the transmission beam alignment component is a prismatic component.

15. The transceiver of claim 14, wherein the prismatic component includes a Risley prism.

16. The transceiver of claim 14, wherein the prismatic component is two Risley prism rods linearly disposed adjacent an output end of the collimator.

17. The transceiver of claim 13, wherein the transmission beam alignment component is a collimator holder connected to a portion of the outer housing.

18. The transceiver of claim 17, wherein the collimator holder has an opening into which the collimator can be disposed in an adjustable manner.

19. The transceiver of claim 18, wherein the opening has a tapered volume.

20. The transceiver of claim 19, wherein the tapered volume provides at least one pivot collimator alignment point in contact with the collimator.

21. The transceiver of claim 12, wherein the collimator is disposed in the elongate groove or shelf.

22. The transceiver of claim 12, wherein the transmission beam propagation medium is an optical fiber.

23. The transceiver of claim 12, wherein the transmission beam comprises pulses of light having:
a wavelength between 1400 nanometers and 1600 nanometers;
a pulse energy of less than 10 microjoules;
a pulse repetition frequency of less than 10 MHz; and
a pulse duration of 0.1 nanoseconds to 100 nanoseconds.

24. The transceiver of claim 12, further comprising:
a second transmitter; and
a second detector.

25. The transceiver of claim 12, wherein the transceiver is part of a lidar system comprising a scanner configured to scan the transmission beam across a field of regard of the lidar system.

26. A transceiver assembly method, comprising:
providing a circuit board including a light-sensitive detector;
providing an inner housing having a first end and an opposing second end;
providing an outer housing that is sized and shaped to at least partially surround the inner housing;
providing a lens;
attaching the inner housing to the circuit board at the first end in a manner to encompass the detector;
installing the lens into the outer housing, whereupon assembly, the lens is configured to focus a received light onto the detector;
sliding the outer housing over a portion of the inner housing;
translating the outer housing to a location such that the lens will focus the received light onto the detector; and
affixing the outer housing to the inner housing, wherein an elongate groove or shelf is formed along a longitudinal intersection of the inner housing and the outer housing.

27. The transceiver assembly method of claim 26, further comprising:
attaching a window to the second end of the inner housing, wherein the circuit board, the inner housing, and the window form a hermetically sealed volume that encloses the detector.

28. The transceiver assembly method of claim 26, further comprising:
providing a collimator and a collimator alignment receptacle attached to the outer housing, wherein the collimator alignment receptacle has an opening into which the collimator can be slidingly engaged;
aligning the collimator; and
affixing the collimator in the alignment receptacle.

29. The transceiver assembly method of claim 28, wherein the alignment receptacle opening has a tapered volume that provides at least one pivot collimator alignment point; and
pivoting the collimator about the at least one pivot collimator alignment point.

30. The transceiver assembly method of claim 26, further comprising:
providing a collimator and a plurality of Risley prism rods;
disposing the collimator and the plurality of Risley prism rods in the elongate groove or shelf;
rotating at least one of the Risley prism rods for aligning a transmission output from the collimator; and
affixing the aligned collimator and Risley prism rods in the elongate groove.

* * * * *